Dec. 12, 1961   J. V. SHOEMAKER   3,012,821
WHEEL COVER
Filed Feb. 19, 1958   2 Sheets-Sheet 1
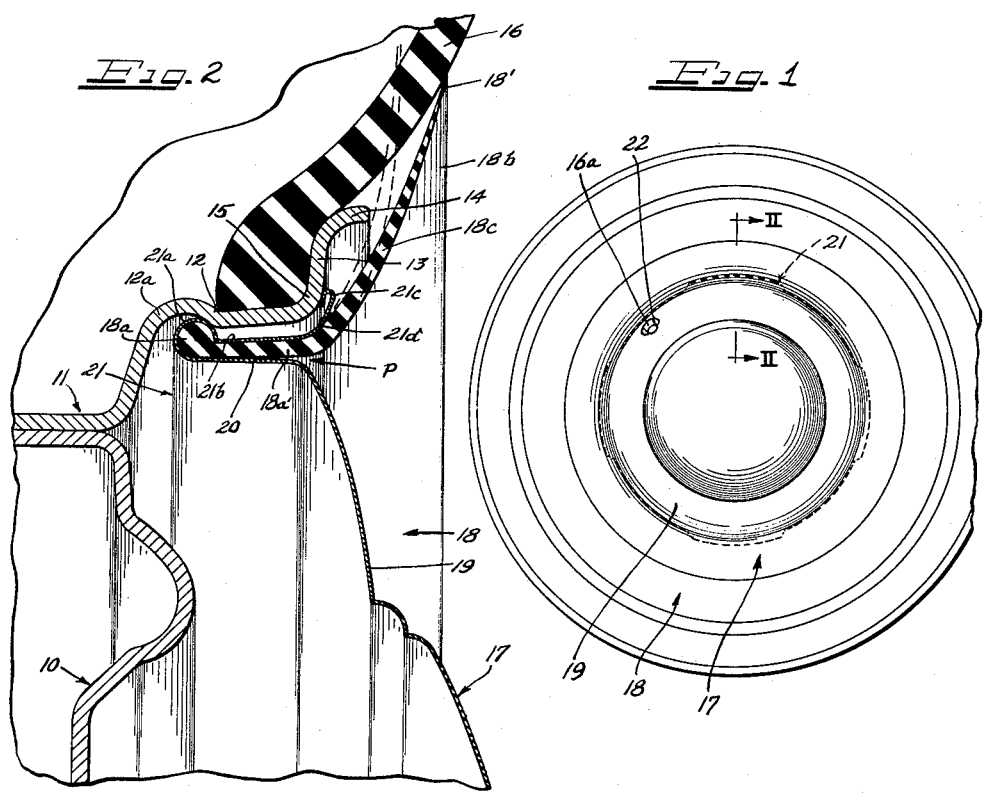
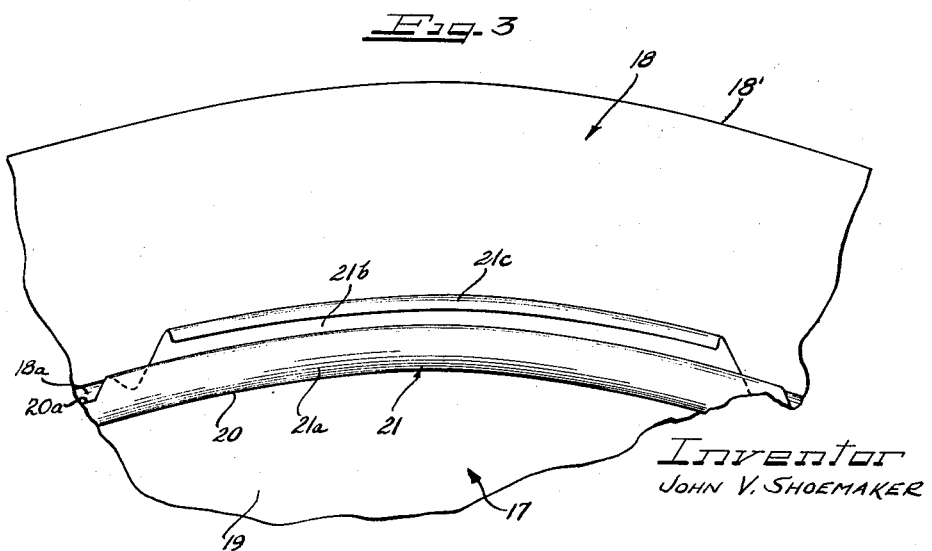
Inventor
JOHN V. SHOEMAKER
by Hill, Sherman, Meroni, Gross & Simpson  Attys.

Dec. 12, 1961     J. V. SHOEMAKER     3,012,821
WHEEL COVER
Filed Feb. 19, 1958     2 Sheets-Sheet 2
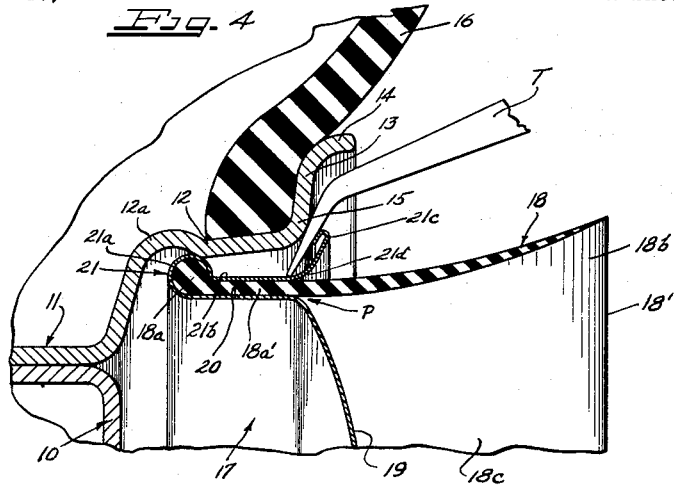
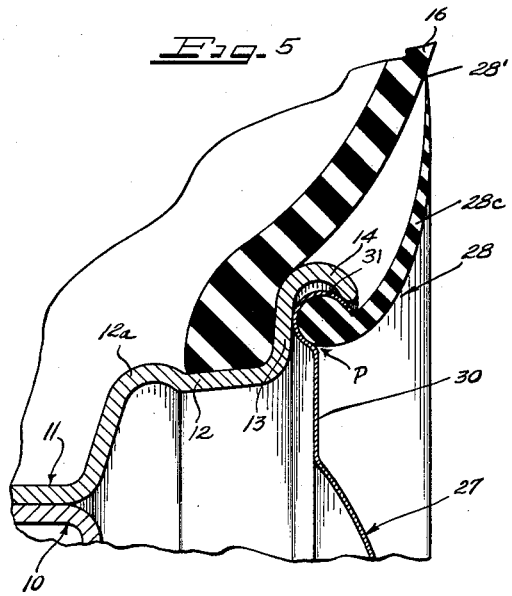
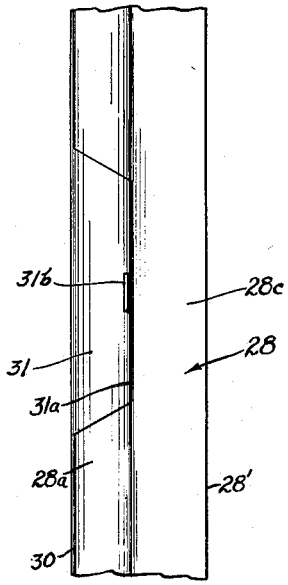
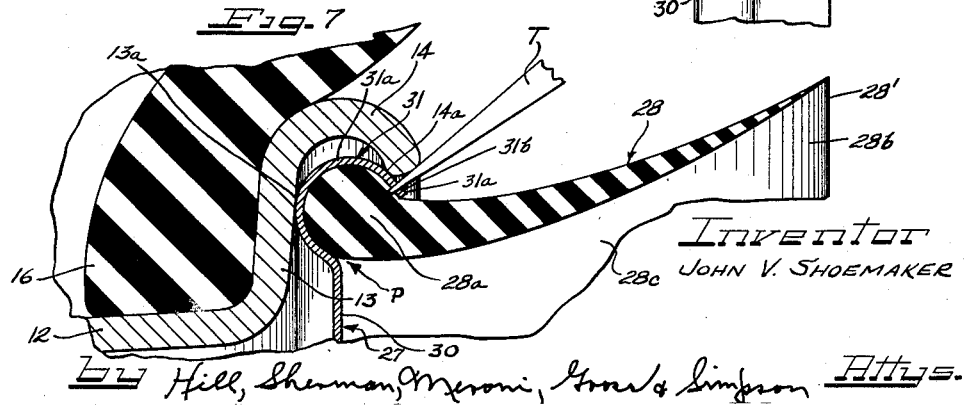
Inventor
JOHN V. SHOEMAKER United States Patent Office
3,012,821
Patented Dec. 12, 1961

3,012,821
WHEEL COVER
John V. Shoemaker, Detroit, Mich., assignor to Lyon Incorporated, Detroit, Mich., a corporation of Delaware
Filed Feb. 19, 1958, Ser. No. 716,064
14 Claims. (Cl. 301—37)

The present invention relates to improvements in wheel structures and more particularly concerns the provision of novel means for providing a wheel with a simulated white or colored side wall for a tire on the wheel.

For ornamental purposes, automobile tires are commonly provided with white side walls, the remainder of the tire being of a more or less black appearance. The white rubber used for the white side wall is applied as a veneer and is of a different composition than the remainder or body of the tire and actually requires a different vulcanizing treatment to the extent that the temperature and time of cure are somewhat different than for the black rubber of the tire body. This has created some necessity for compromise in the vulcanization of tires with white side walls, generally resulting in a sacrifice of quality in the white side wall. To overcome the disadvantages of cure compromise, it has been proposed to secure the white side wall portion or veneer to the side wall of the tire after the tire has been vulcanized. Such after-attached side wall members are inherently liable to such disadvantages as peeling, and the like, and of course require a separate attaching or vulcanizing operation that raises cost.

It has also been heretofore proposed to provide separate simulated white or colored side wall ring members that are secured between the terminal flange of the tire rim and the bead portion of the tire and which hug the side wall of the tire. Such simulated or mock tire white side wall rings require, of course, that the tire be deflated in order to install the ring members. Should such simulated white side wall rings become damaged, it is necessary to deflate the tire not only to remove the damaged ring but also to replace the ring. Furthermore, a disadvantage of such simulated white side wall rings is that, especially with tubeless tires, there is interference with proper sealing, gripping engagement of the tire bead portion with the opposing surfaces of the tire rim and more particularly the radial flange or the radial rim portion of the terminal flange, since formerly the white side wall ring was interposed between the tire side wall and the radial flange or radial portion of the terminal rim flange.

It is accordingly an important object of the present invention to overcome the foregoing difficulties and disadvantages of the prior expedients and to provide a simulated tire white side wall of improved appearance and which can be applied, or removed, or replaced without disturbing the tire.

Another object of the invention is to provide a novel tire side wall simulating ring member which is adapted for assembly with a wheel cover for disposition over the outer side of the wheel.

A further object of the present invention is to provide a novel tire side wall simulating ring member and wheel cover combination wherein the combination is self-sustaining upon the wheel and when in assembly upon the wheel the tire side wall simulating ring member is more snugly retained in assembly with the wheel cover.

Another and still further object of the invention is to provide a tire side wall simulating flexible ring device which is adapted to be carried in clamped engagement with the axially outer side of a wheel cover.

A further important object of the invention is to provide circumferentially spaced retaining extensions disposed radially outwardly of the circular cover area which extensions are looped and provide an axially outwardly opening pocket in which an inner margin of a tire side wall simulating ring member is retainingly engaged in assembly therewith, and with the retaining extensions being adapted to cooperate either with the intermediate rim flange or the terminal rim flange.

Other objects, features and advantages of the present invention will more readily become apparent from the following detailed description of certain preferred embodiments, taken in conjunction with the accompanying sheets of drawings, in which:

FIGURE 1 is a side elevation of my wheel structure showing the novel relationship of the cover and ring member assembly with respect to the wheel;

FIGURE 2 is an enlarged fragmentary cross-sectional view taken substantially on the line II—II of FIGURE 1 looking in the direction indicated by the arrows;

FIGURE 3 is an enlarged fragmentary rear elevation of the wheel cover and ring member assembly;

FIGURE 4 is an enlarged fragmentary cross-sectional view similar to FIGURE 2 only showing the manner in which the cover and ring member assembly may be removed from the wheel;

FIGURE 5 is an enlarged fragmentary view similar to FIGURE 2 only illustrating a modified form of my invention;

FIGURE 6 is an enlarged fragmentary plan view of a modified form of the wheel cover and ring member assembly as shown in FIGURE 5; and FIGURE 7 is an enlarged fragmentary cross-sectional view of the modified form of my invention similar to FIGURE 4 only showing the manner in which the modified assembly may be removed from the wheel.

Referring to FIGURES 1 and 2, an automobile wheel including a disk spider wheel body 10 supports a multiflanged stepped tire rim 11 including an intermediate generally axially outwardly extending rim flange 12, a radial rim flange 13, and an axially elongated terminal rim flange 14. The intermediate rim flange 12 is provided with an annular grooved area indicated at 12a and the junction of the rim flanges 12 and 13 is provided with an annular shoulder 15. Mounted upon the tire rim is a pneumatic tire assembly 16 of preferably the tubeless type and which may be inflated by inserting air into a valve stem 16a, shown in FIGURE 1.

Disposed at the outer side of the wheel is a disk type circular wheel cover member 17 and a side wall ring simulating member indicated generally at 18.

The wheel cover 17 is preferably of the self-retaining type. To this end, the cover 17 includes an annular circular portion 19. Axially inwardly of portion 19 is a generally axially inwardly radially outwardly facing annular marginal portion 20 terminating in an arcuate or curved cover marginal edge 20a of a diameter to telescope inside of the intermediate rim flange 12 in radially spaced confronting relationship. At the axially inner edge or edge area 20a of the marginal portion 20 is disposed a series of circumferentially spaced hook shaped cover retaining extensions 21. Each of the extensions 21 includes an enlarged semi-circular bulb portion 21a, a generally axially outwardly extending portion 21b disposed in radially spaced relationship between the intermediate rim flange 12 and the annular cover marginal portion 20, and a generally radially and axially outwardly extending terminal beaded portion 21c which is adapted to abut against the annular rim shoulder 15. The bead 21c also acts as a pry-off bead to aid in the removal of the cover from the wheel.

Any suitable number of the resiliently deflectable finger-like extensions 21 may be provided as, for example, at four circumferentially spaced intervals about the circumference of the wheel cover member 17. Each of the extensions 21 is of a normal diameter wherein the bulb-like portion 21a and the terminal beaded portion 21c lie on a slightly larger diameter than the diameter of the inside surface area of the tire rim in the assembled relationship of the cover on the wheel. Thus, when the cover is applied to the wheel the extensions 21 are deflected radially inwardly into tensioned engagement with the tire rim 11.

The cover 17 is assembled on the outer side of the wheel by registering the valve stem 16a with a valve stem aperture 22 (FIGURE 1). Then by applying axially inward pressure on the cover, the annular series of retaining finger-like extensions 21 effect cover retaining engagement with the tire rim. It will be appreciated the cover may be made from any suitable material such as spring steel and the like.

For affording the appearance of the tire 15 having a white side wall, the ring member 18 is preferably made from a rubber-like material and for which a synthetic rubber is characterized by especially desirable form sustaining resilient flexibility, superior color qualities and excellent durometer control.

For affording a tire side wall simulating shape for the ring member 18, it is of generally axially outwardly curved transverse or radial shape terminating in a thin, and in this instance a substantially feather edge radially outer extremity 18' engageable against the side wall of the tire 15. In assembly with the wheel, the outer extremity appears as a fine line generally merging with the wheel so that the ring member appears on the wheel as though it were an integral side wall portion of the tire.

The side wall ring member 18 is provided with a radially inner enlarged bulb-like margin or portion 18a and a radially outer margin 18b which margins 18a and 18b are linked together by an annular arcuate intermediate ring section 18c. The inner margin 18a includes an annular axially outwardly extending portion 18a' which is more directly connected to the intermediate ring section 18c than the bulb portion of the inner margin 18a.

From a consideration of FIGURES 2 and 4 of the cover member 17 it is apparent the cover margin 20 including the curved cover marginal edge 20a, and the finger extensions 21 define together an annular pocket area indicated generally at P. To assemble the ring 18 with the cover 17, the inner margin 18a is moved axially inwardly between the outer cover margin 20 and the extension portion 21b until the bulb-like inner marginal portion 18a is seated within the bulb-like portion 21a of the finger extensions 21. In assembled relationship, the linking portion of the margin 18a' is also disposed between or sandwiched between the cover and the retaining extensions 21.

When the ring is in assembly with the cover and the cover assembly is in assembly with the wheel, the inner ring margin 18a is snugly and frictionally retained in place with respect to the cover 19 in a manner to resist accidental pull-out of the ring 18. By providing the enlarged bulb-like inner marginal area 21a further frictional resistance is developed in order to resist accidental pull-out.

When the ring is in assembly with the wheel, the outside diameter of the ring member 18 at the tire engaging edge 18' thereof, is such that the edge 18' engages the tire wall on the incurve of the outer side wall, in radially spaced relation to the terminal rim flange 14 with the intermediate ring portion 18c being bridged over the terminal rim flange 14.

To apply the cover and ring assembly on the wheel, the valve stem 16a is centered with the cover opening 22 and the assembly is pressed against the wheel and the bulb-like portion 21a of the fingers 21 are deflected and retainingly engaged in cover retaining assembly in the annular groove 12a on the wheel in a manner whereby the ring member 18 is also carried in assembly with the wheel by the cover 17. As the ring is applied to the wheel the ring member 18 will move from the dotted line position to the full line position shown in FIGURE 2.

The cover and ring may be moved from the wheel by grasping the ring marginal edge 18' and pulling ring flap portion 18b axially outwardly and radially inwardly with the ring moving away from a fulcrum or pivot area designated generally at 21d. The pivot area 21d aids in maintaining the ring member bridged over and out of contact with the rim flange 14 to prevent rubbing of the ring member thereagainst. Then a hook-like pry-off tool T may be forced between the cover and the rim underneath the beaded outer marginal portion 21c of the finger-like extensions 21 in a manner whereby the tip end of the tool is directly applied to the finger portion 21b to cause the bulb-like portion 21a to be released from the annular groove 12a.

In FIGURES 5–7 is shown another form of my invention wherein the same reference numerals have been applied wherever identical parts are involved with the terminal rim flange 14 in this instance being of a hook-like conformation.

A wheel cover member is designated generally at 27 and a tire side wall simulating member is designated generally at 28. The cover member 27 includes an outer marginal area 30 which extends radially outwardly and has disposed at its radially outer edge a series of circumferentially spaced resiliently deflectable cover retaining extensions 31 each of which includes a bulb or hook-like shaped portion or area 31a. The extensions 31 are also cooperable with the cover margin 30 and defining a generally axially outwardly opening pocket P on the outer side of the cover, as in the first form of my invention.

The tire side wall ring simulating member 28 includes an inner marginal portion 28a which is of an enlarged bulb shaped cross-sectional configuration and with the ring member 28 also including an outer margin 28b which is linked with the inner margin 28a by an arcuate intermediate linking portion 28c similar to the corresponding portion on the first form of my invention. The ring simulating member 28 is also provided with a feather edge 28' for engagement against the incurve of the tire side wall 16.

The extensions 31 are arranged in a common circle and normally have a diameter slightly larger than the inside diameter of the terminal rim flange 14 so that when the cover is applied to the wheel the extensions 31 are deflected radially inwardly with the extensions being retainingly engaged upon the wheel at rim bias points or areas 13a and 14a with the deflection of the extensions 31 being sustained by virtue of the engagement of the extensions 31 with the bias point 14a.

The inner margin 28a of the ring member 28 is enlarged and bulb-shaped so as to snugly nest within the bulb hook-like contour of the retaining extension on the axially outer side of the wheel in assembly therewith. When the cover is in assembly upon the wheel the retaining action between the cover extension 31 and the inner ring margin 28a is augmented with the frictional resistance being increased by virtue of the compression forces set up on the inner ring margin 28a.

The cover and ring assembly may be assembled on the wheel in much the same manner as described previously herein. The assembly may be removed in a slightly different manner, however, since after the feather edge 28a is grasped and moved away from the wheel a pry-off tool T may be utilized with respect to extended terminal ends 31a of the finger extensions 31. To this end, the tip of the pry-off tool may be inserted into slots 31b on the extended terminal end portion 31a of the finger extensions 31 in a manner whereby the tool may be fulcrumed on the terminal rim flange 14 so the cover retaining forces between the cover and the tire rim may be relieved to an extent enabling the ring and cover assembly to be removed from the wheel.

It will be understood that modifications and variations may be effected without departing from the scope of the novel concepts of the present invention.

I claim as my invention:

1. In a wheel structure, a wheel bearing a pneumatic tire and having a tire rim including a terminal rim flange, a wheel cover member having an outer continuous annular margin and circumferentially spaced resiliently deflectable retaining extensions, the extensions extending axially outwardly and being connected to said outer margin in cover retaining engagement with the tire rim, said cover member, at the area of said outer margin, and said retaining extensions defining an annular generally axially outwardly opening cover pocket area, and a tire side wall ring simulating member having its inner margin disposed on the axially outer side of the wheel cover member retainingly engaged by said resiliently deflectable retaining extensions and maintained in said cover pocket area with said tire side wall ring overlying said terminal rim flange and having its outer margin adapted for engagement against the side wall of the pneumatic tire.

2. In a wheel structure, a wheel bearing a pneumatic tire and having a tire rim including a terminal rim flange, a wheel cover member having an outer continuous annular margin and circumferentially spaced resiliently deflectable retaining extensions, the extensions extending axially outwardly and being connected to said outer margin in cover retaining engagement with the tire rim, said cover member, at the area of said outer margin, and said retaining extensions defining an annular generally axially outwardly opening cover pocket area, and a tire side wall ring simulating member having its inner margin disposed on the axially outer side of the wheel cover member retainingly engaged by said resiliently deflectable retaining extensions and maintained in said cover pocket area with said tire side wall ring bridged over said terminal rim flange and having its outer margin adapted for engagement against the side wall of the pneumatic tire, said tire side wall ring member having a thickened bulged inner ring margin of substantially greater cross-sectional thickness than the remainder of said ring member retainingly engaged in said pocket area, the cover pocket area having a bulged area with the bulged inner ring margin retainingly engaged therein preventing pull out of the inner ring margin from the cover pocket area.

3. In a wheel structure, a wheel bearing a pneumatic tire and having a tire rim including a terminal rim flange, a wheel cover member having an outer continuous annular margin and circumferentially spaced resiliently deflectable hook-like retaining extensions, the extensions extending axially outwardly and being connected to said outer margin in cover retaining engagement with the tire rim, said cover member, at the area of said outer margin, and said retaining extensions defining an annular generally axially outwardly opening cover pocket area, and a tire side wall ring simulating member having its inner margin disposed on the axially outer side of the wheel cover member retainingly engaged by said resiliently deflectable retaining extensions and maintained in said cover pocket area with said tire side wall ring bridged over said terminal rim flange and having its outer margin adapted for engagement against the side wall of the pneumatic tire, said tire rim having an annular rim groove and with said retaining extensions being retainingly engaged with the tire rim and said rim groove, the inner ring margin being nestingly engaged with the deflectable hook-like extensions, the hook-like extensions operating not only to retain the cover on the wheel but also to prevent pull-out of the inner ring margin from the cover pocket area.

4. In a wheel structure, a wheel bearing a pneumatic tire and having a tire rim including a terminal rim flange, a wheel cover member having an outer continuous annular margin and circumferentially spaced resiliently deflectable retaining extension structure connected to said outer margin in cover retaining engagement with the tire rim, said cover member at the area of said outer margin and said retaining extension structure having an annular generally axially outwardly opening cover pocket area, and a tire side wall ring simulating member having its inner margin disposed on the axially outer side of the wheel cover member retainingly engaged and maintained in said cover pocket area by said resiliently deflectable retaining extension structure with said tire side wall ring bridged over said terminal rim flange and having its outer margin adapted for engagement against the side wall of the pneumatic tire, said tire rim having an annular rim groove and with said retaining extension structure including a series of resiliently deflectable hook-like finger extensions retainingly engaged in said annular rim groove, said retaining extensions each provided with slots disposed between said pneumatic tire and said side wall ring member accessible upon deflection of the outer ring margin away from the pneumatic tire for receipt of a pry-off tool to remove the cover member from the wheel.

5. A wheel cover assembly including a wheel cover member having an outer continuous annular margin and circumferentially spaced resiliently deflectable axially outwardly extending retaining extensions extending radially of the outer margin and connected to said outer margin at its radially outer edge, said cover member, at the area of said outer margin, and said retaining extensions defining an annular axially outwardly opening cover pocket area, and a tire side wall ring simulating member having its inner margin disposed on the axially outer side of the cover member and retainingly engaged by said resiliently deflectable retaining extensions with said tire side wall ring simulating member being adapted to overlie the terminal rim flange of a tire rim so that the outer margin may be abutted aaginst the side wall of a pneumatic tire.

6. In a wheel structure, a wheel bearing a pneumatic tire and having a tire rim possessed of a terminal rim flange, a wheel cover member having an outer continuous annular margin and circumferentially spaced resiliently deflectable generally axially outwardly extending hook-like retaining extensions integral with the cover disposed radially outwardly of said outer margin in cover retaining engagement with the terminal rim flange of the tire rim, said cover member, at the area of said outer margin, and said retaining extensions defining an annular generally axially outwardly opening cover pocket area, and a tire side wall ring simulating member having its inner margin disposed on the axially outer side of the wheel cover member retainingly engaged by said resiliently deflectable retaining extensions and maintained in said cover pocket area with said tire side wall ring bridged over said terminal rim flange and having its outer margin adapted for engagement against the side wall of the pneumatic tire.

7. In a wheel structure, a wheel bearing a pneumatic tire and having a tire rim including a terminal rim flange defining a radially inwardly facing annular grooved area, a wheel cover member having an outer continuous annular margin and circumferentially spaced generally axially outwardly extending resiliently deflectable retaining extensions connected to and extending radially outwardly away from said outer margin in cover retaining engagement with the annular grooved area of the tire rim, said cover member, at the area of said outer margin, and said retaining extensions defining an annular generally axially outwardly opening cover pocket area on the outer side of the cover member, and a tire side wall simulating ring member having its inner margin disposed on the axially outer side of the wheel cover member retainingly engaged by said resiliently deflectable retaining extensions and maintained in said cover pocket area with said tire side wall ring bridged over said terminal rim flange and having its outer margin adapted for engagement against the side wall of the pneumatic tire.

8. In a wheel structure, a wheel bearing a pneumatic tire and having a tire rim including a terminal rim flange defining a radially inwardly facing annular grooved area, a wheel cover member having an outer continuous annular margin and circumferentially spaced generally axially outwardly extending resiliently deflectable retaining extensions connected to and extending radially outwardly away from said outer margin in cover retaining engagement with the annular grooved area of the tire rim, said cover member, at the area of said outer margin, and said retaining extensions defining an annular generally axially outwardly opening cover pocket area on the outer side of the cover member, and a tire side wall simulating ring member having its inner margin disposed on the axially outer side of the wheel cover member retainingly engaged by said resiliently deflectable retaining extensions and maintained in said cover pocket area with said tire side wall ring bridged over said terminal rim flange and having its outer margin adapted for engagement against the side wall of the pneumatic tire, said extensions being hook-like including an outer free terminal end area arched in the groove and with said tire side wall simulating ring member having its inner margin thickened and snugly nested with the hook-like area of the extension on the outer side of the cover member in retaining assembly therewith.

9. The wheel structure of claim 8 further characterized by said free terminal end area of said retaining extensions extending outwardly away from and beyond the terminal rim flange and being slotted to receive a tip end of a pry-off tool for removal of the cover member and ring member assembly, the slots in the extensions being disposed on the axially inner side of the ring member.

10. In a wheel structure, a wheel bearing a pneumatic tire and having a tire rim including an intermediate rim flange and a terminal rim flange, a wheel cover member having an outer continuous axially inwardly extending annular margin for disposition opposite the intermediate rim flange and circumferentially spaced generally axially outwardly extending resiliently deflectable retaining extensions return bent over and connected to the axially inner end of said outer margin in cover retaining engagement with the intermediate rim flange of the tire rim, said cover extensions being radially spaced defining an annular generally axially outwardly opening cover pocket area, and a tire side wall ring simulating member having its inner margin disposed on the axially outer side of the wheel cover member retainingly engaged by the resiliently deflectable retaining extensions and maintained in said cover pocket area between the axially inwardly extending annular margin and the retaining extension structure with said tire side wall ring simulating member bridged over said terminal rim flange and having its outer margin adapted for engagement against the side wall of the pneumatic tire.

11. In a wheel structure, a wheel bearing a pneumatic tire and having a tire rim including an intermediate rim flange and a terminal rim flange, a wheel cover member having a outer continuous axially inwardly extending annular margin for disposition opposite the intermediate rim flange and circumferentially spaced generally axially outwardly extending resiliently deflectable retaining extensions return bent over and connected to the axially inner end of said outer margin in cover retaining engagement with the intermediate rim flange of the tire rim, said cover member at the area of said outer margin and said retaining extensions being radially spaced defining an annular generally axially outwardly opening cover pocket area, and a tire side wall ring simulating member having its inner margin disposed on the axially outer side of the wheel cover member retainingly engaged in said cover pocket area between the axially inwardly extending annular margin and the retaining extensions with said tire side wall ring simulating member bridged over said terminal rim flange and having its outer margin adapted for engagement against the side wall of the pneumatic tire, the intermediate rim flange having a radially opening grooved rim area with said extension area having an enlarged bulb area retainingly engaged in the grooved rim area and with the inner margin being enlarged and retained in the enlarged bulb area on the cover.

12. The wheel structure of claim 10 further characterized by said circumferentially spaced retaining finger-like extensions each having its axially outer end turned radially outwardly and bottomed against the tire rim and with the ring member bottomed against the radially inner surface area of said finger-like extensions.

13. In combination, a cover member for assembly on a vehicle wheel having its outer cover margin provided with circumferentially spaced generally axially outwardly extending resiliently deflectable cover retaining extensions, and a synthetic ring member for assembly with the cover margin and for concealing a portion of the side wall of a pneumatic tire, the outer margin and the cover retaining extensions defining a cover pocket area and with the ring member having its inner ring margin disposed in the cover pocket area and thereby retainingly maintained in assembly with the cover member as a consequence of having its radially inner and outer inner ring margin surfaces engaged under resilient tension by the outer cover margin and the cover retaining extensions.

14. The combination of claim 13 further characterized by the juncture of the outer cover margin and the circumferentially spaced cover retaining extensions comprising an enlarged ring gripping portion, the inner ring margin having an enlarged bulb-like ring portion retainingly engaged by the enlarged ring gripping portion and placed under tension by the resiliently deflectable cover retaining extensions thereby resisting the ring and cover members from becoming accidentally separated.

References Cited in the file of this patent

UNITED STATES PATENTS

| 2,123,025 | Ramirez | July 5, 1938 |
| 2,368,246 | Lyon | Jan. 30, 1945 |
| 2,405,389 | Lyon | Aug. 6, 1946 |
| 2,490,822 | Lyon | Dec. 13, 1949 |
| 2,600,412 | Lyon | June 17, 1952 |
| 2,882,095 | Lyon | Apr. 14, 1959 |

FOREIGN PATENTS

| 1,061,278 | France | Nov. 23, 1953 |
| 509,850 | Canada | Feb. 8, 1955 |